June 14, 1960  H. SHERMAN, JR  2,941,101
CATHODE-RAY TUBE FOR RADAR SCOPES AND THE LIKE
Filed July 8, 1953  4 Sheets-Sheet 1

INVENTOR.
HARRY SHERMAN, JR.
BY
John J. Rogan
ATTORNEY

June 14, 1960  H. SHERMAN, JR  2,941,101
CATHODE-RAY TUBE FOR RADAR SCOPES AND THE LIKE
Filed July 8, 1953  4 Sheets-Sheet 2
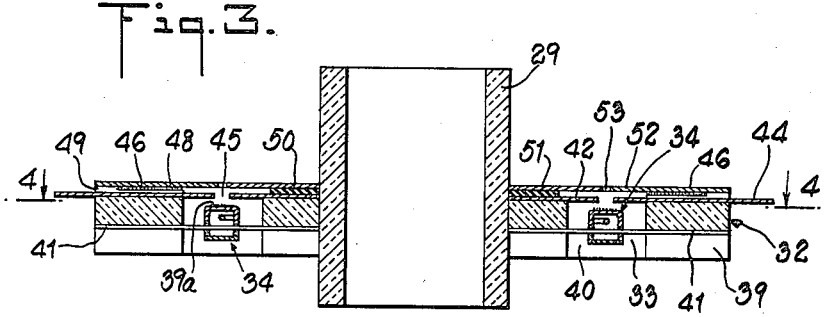
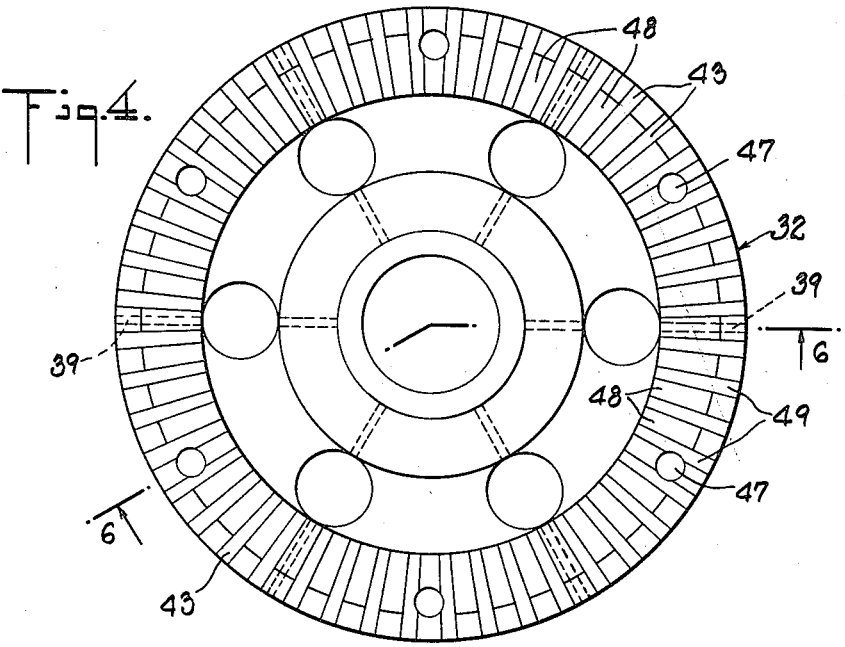
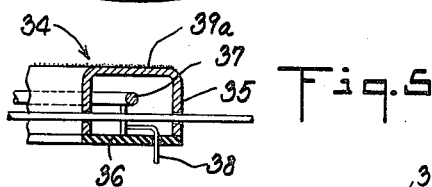
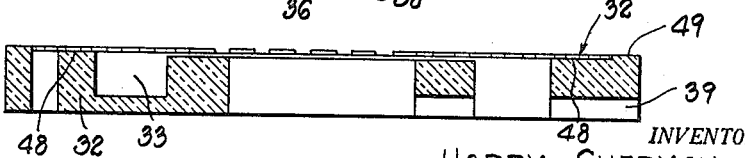
INVENTOR.
HARRY SHERMAN, JR.
BY John J. Rogan
ATTORNEY June 14, 1960 H. SHERMAN, JR 2,941,101
CATHODE-RAY TUBE FOR RADAR SCOPES AND THE LIKE
Filed July 8, 1953 4 Sheets-Sheet 3

INVENTOR.
HARRY SHERMAN, JR.
BY
*John J. Rogan*
ATTORNEY

June 14, 1960 H. SHERMAN, JR 2,941,101
CATHODE-RAY TUBE FOR RADAR SCOPES AND THE LIKE
Filed July 8, 1953 4 Sheets-Sheet 4
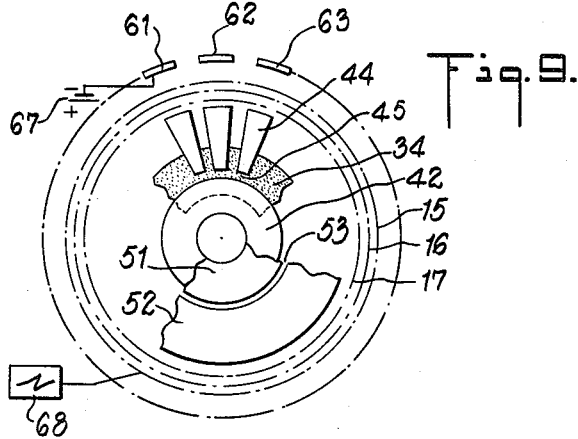
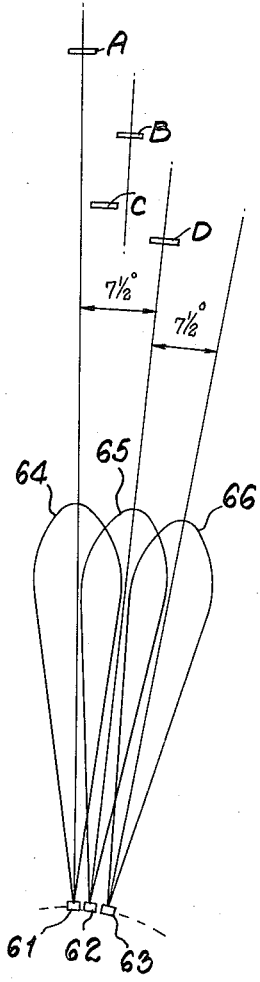
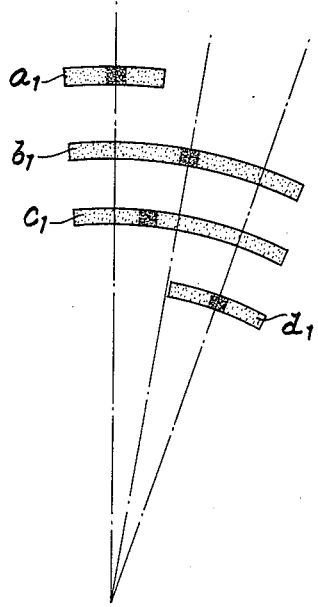
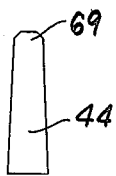
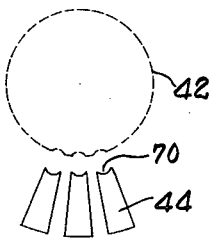
INVENTOR.
HARRY SHERMAN, JR.
BY John J. Logan
ATTORNEY United States Patent Office 2,941,101
Patented June 14, 1960

2,941,101
CATHODE-RAY TUBE FOR RADAR SCOPES AND THE LIKE

Harry Sherman, Jr., Bloomfield, N.J., assignor to National Union Electric Corporation, a corporation of Delaware Filed July 8, 1953, Ser. No. 366,735

3 Claims. (Cl. 313—69)

This invention relates to cathode-ray tubes and more especially it relates to tubes especially designed for sonar, radar, and similar indicating or display systems.

A principal object of the invention is to provide an improved cathode-ray tube for displaying indications of the polar coordinate type.

Another object is to provide a novel cathode-ray tube for use in radar or sonar systems where sequential azimuthal scanning is avoided.

A feature of the invention relates to a cathode-ray tube having simplified means to develop a multiplicity of discrete cathode-ray beams disposed in circular array, in conjunction with novel deflector means common to all the beams for individually controlling their radial positions.

Another feature relates to a novel cathode-ray tube of the plan-position-indicator type such as used in radar or sonar systems, and employing a plurality of beam-developing means including a series of circumferentially spaced grid elements each energized in correspondence with a corresponding discrete bearing to be displayed; and designed to interpolate bearing means between said adjacent discrete bearings.

A still further feature relates to the novel organization, arrangement and relative location and interconnection of parts which cooperate to provide an improved polar coordinate cathode-ray tube.

Other features and advantages, not particularly enumerated, will become apparent after a consideration of the following detailed descriptions and the appended claims.

Fig. 3 is a sectional view of Fig. 2, taken along the line 3—3 thereof.

Fig. 4 is a sectional view of Fig. 3, taken along the line 4—4 thereof.

Fig. 5 is a detailed sectional view of the heater-cathode unit.

Fig. 6 is a sectional view of Fig. 4, taken along the line 6—6 thereof.

Fig. 7 is an overall view of the tube, in longitudinal broken section showing the manner of supporting the electrode mount.

Fig. 9 is a generalized schematic wiring diagram showing one manner of using the tube according to the invention.

Fig. 10 is a schematic directional sensitivity diagram explanatory of the invention.

Fig. 11 is a magnified view of part of the display screen showing the display corresponding to the objects illustrated in Fig. 10.

Figs. 12 and 13 are modifications of the control grid electrodes of the invention.

As is well-known in cathode-ray tube indicators used in radar or sonar systems and the like, the visual display is in the form of a luminescent spot whose angular position around the center of the screen represents the angular bearing of a distant object with respect to a fixed point and whose radial position from that center represents the range or distance of the object. In the conventional radarscope, the indicating spot is produced by a single focused cathode-ray beam under control of a corresponding single control grid which is sequentially energized or pulsed for each angular bearing being scanned. Such a system has certain disadvantages including, for example, the "noise" voltage introduced by the relatively rapid scanning movement of the single beam; and the fact that the beam must be subjected to a spiral scanning pattern. It has been proposed, instead of using a single search antenna to employ a series of fixed search antennas which are equally distributed around a common point in a circular array. The present invention finds its main utility in connection with a system of that type wherein a series of search or pick-up antennas, for example forty-eight, are arranged in a circular array and are connected to the radar scope according to the invention.

Figure 1:
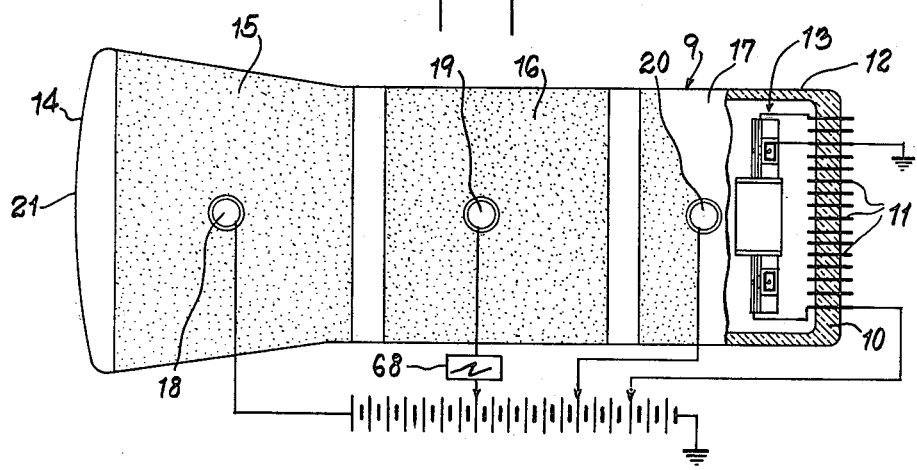
Fig. 1 is a longitudinal plan view of a cathode-ray tube according to the invention, with part of the bulb broken away.
Figure 2:
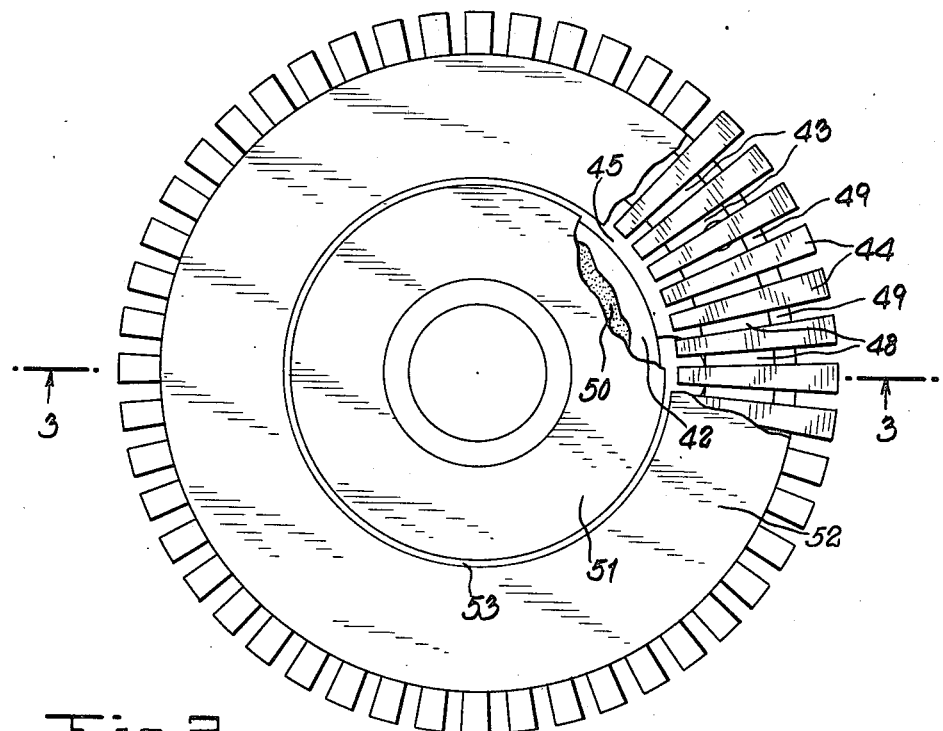
Fig. 2 is a top-plan view of the multi-gun electrode mount, with part of the gun electrodes broken away.
Figure 2:
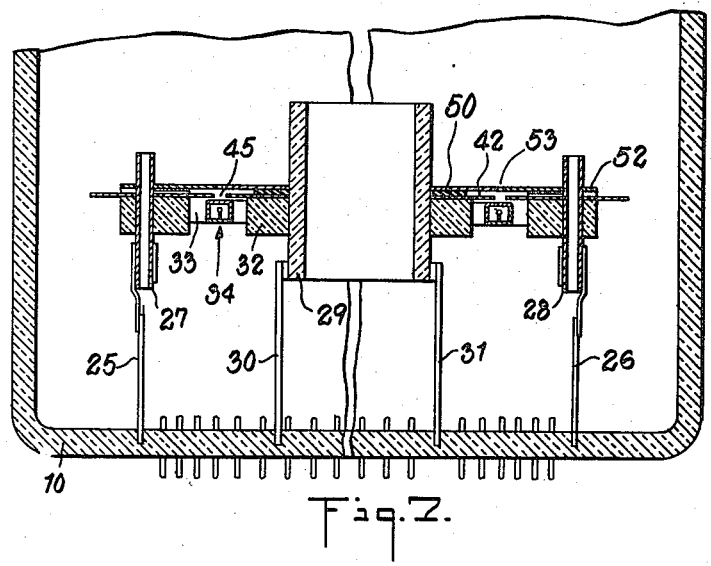
Figure 8:
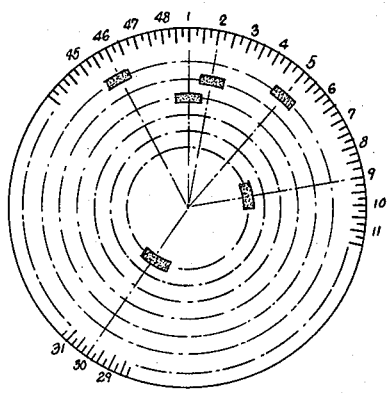
Fig. 8 is a schematic diagram showing one general type of display produced by the tube according to the invention.

As shown in Fig. 1 of the drawing, the radar scope comprises any well-known shape of cathode-ray tube bulb or envelope 9 sealed to the glass header 10 through which the various lead-in wires 11 are connected. Suitably mounted within the neck portion 12 of the bulb is an electrode mount indicated schematically by the numeral 13 and shown in magnified sectional view in Fig. 3. The opposite enlarged end wall 14 of the bulb contains the usual luminescent or phosphorescent screen which produces a visual display when bombarded by cathode rays from the mount 13. The inside surface of the glass wall of the bulb is provided with three conductive and electron beam accelerating coatings 15, 16, 17, each having a suitable connector button 18, 19, 20, in contact therewith so that external contact can be made to the coatings. As shown in Fig. 8, the screen 14 may be marked off exteriorly of the bulb with suitable bearing or azimuth markings, or if desired, a separate translucent shield can be mounted adjacent the screen end 14 and this shield can be provided with the desired azimuth markings. The particular tube to be described is designed to produce at least ninety-six discrete bearing indications around the center point 21 of the screen. However, the tube is so arranged that only forty-eight control elements or grids are required, and by interpolation between adjacent grids the additional bearing indications can be arrived at.

Referring more particularly to Figs. 2 to 7, the header 10 has sealed therein a series of six support rods, two of which are shown as 25, 26. These rods are equally spaced circumferentially from each other and at the same radial distance from the center of the header 10 to form the main supports for the electrode mount. Supported on each of the six rods 25, 26, etc., is a corresponding ceramic rod or tube 27, 28, etc., with serve as the anchoring supports for the various electrodes of the mount.

An additional central support for the electrodes of the amount, comprises a tubular ceramic member 29, which is suitably fastened to a pair of metal rods 30, 31, sealed in to the header 10. Symmetrically surrounding and cemented to the member 29 is a ceramic block 32. Block 32 has an annular recess or groove 33 formed in its upper face to receive the annular heater-cathode unit 34. This unit comprise a channel-shaped metal member 35, the open bottom end of which is closed off by a suitable annular insulator member 36. Supported from member 36 is an annular heater wire or element 37 which is provided with a pair of lead-in members 38 for supplying heating current thereto. The upper face of member 35 is provided with a coating 39a of thermionically emissive material such as is conventionally used in cathodes for cathode-ray tubes and the like.

For the purpose of supporting the heater-cathode unit centrally within the groove 33, the bottom face of ceramic block 32 has six radial grooves 39 formed therein. These grooves are cut to a depth which is greater than the thickness of the bottom portion 40 of the groove 33. The side walls of the cathode member 35 are provided with six sets of aligned perforations to receive the corresponding six support rods 41. These rods are cemented into the corresponding grooves 39 in the ceramic block and serve to support the heater-cathode unit 34 centrally within the groove 33, while allowing it to expand when heated. For that purpose the rods 41 pass through respective aligned openings in the side walls of member 35.

Cemented or otherwise anchored to the top face of the ceramic block 32 is an annular metal electrode 42. The margin of the top surface of block 32 is provided with forty-eight equally spaced grooves 43 to receive forty-eight individual metal grid strips 44 all of the same length. These metal strips form individual grid control members and they are assembled in their respective slots so that their inner ends are all equally spaced from the circumferential edge of the electrode 42 to define an annular grid or gap 45 which is subdivided into forty-eight radial sections by the ends of the forty-eight respective metal strips 44. When the strips have been accurately located, they can be cemented in place by a layer of ceramic cement 46 to maintain their spaced relation with respect to the member 41.

The ceramic block 32 has a series of six equally spaced perforations 47 through which pass the respective ceramic support rods 27, 28, etc., and to which the block 32 can be cemented. It should be observed that the inner portion 48 of the slotted margin on the upper face of block 32 is undercut with respect to the outer margin so that the outer margin 49 is raised above the inner margin 48. Superposed on the electrode 42 is an annular insulator washer 50 of mica or the like. Superposed on the washer 50 and cemented to the member 29 is an annular metal electrode 51. Cemented to the upper face of block 32 and in planar alignment with member 51, is another but larger annular metal electrode 52 whose inner diameter is slightly greater than the outer diameter of member 51, so as to define an annular gap 53 therebetween. This gap 53 is in annular alignment with the gap 45 and with the central portion of the cathode member 35.

As shown schematically in Fig. 1, the coatings 15, 16 and 17 on the inner wall of the bulb, are connected to respectively increasing positive potentials with respect to the cathode, it being understood of course that the cathode is connected to a suitable return potential such as ground. The individual grid strips 44 are respectively connected to individual signal pick-up devices and the electrode 42 is connected to a suitable biasing tap on the direct current voltage supply for the tube. Normally, the potential on the grid strips 44 is such that in the absence on a grid strip 44 of any signal from its corresponding pick-up device, the electrons from the cathode 39 are blanked off in the region between that particular grid strip and the common grid electrode 42. On the other hand, if all the grid strips should be simultaneously energized by pick-up signals, the electrons from the cathode 39 will result in a substantially continuous annular electron beam.

The electrodes 51 and 52 are connected to a suitable positive voltage so as to focus the annular electron beam into an annular trace on the screen 14 of the tube. The diameter of this annular trace will, therefore, be a function of the potential applied to the electrodes 51, 52, and of course to the coatings 15, 16 and 17. In accordance with well-known electron gun theory, by a suitable arrangement of potentials this annular trace on the cathode-ray tube screen is focused and magnified in diameter in accordance with the relative potentials applied to the electrodes 15, 16, 17.

Referring to Fig. 10, there is shown in schematic form a portion of the system using the tube according to invention. The parts shown in Fig. 9, which are the same as those of the remaining figures of the drawing, are identified by the same designation numerals. For simplicity in the drawing, only three transducer pick-up units 61, 62, 63 are shown and likewise only three of the individually controllable grid strips 44 are shown. It will be understood, of course, that each one of the forty-eight grid strips is connected by a respective conductor to a corresponding one of the transducer pick-up units which are arranged in a circular array for scanning in azimuth, or the like. The transducer units may be keyed on and off by sonar or radar range signal pulses, and the voltage pulse picked up by each transducer unit is impressed on its corresponding grip strip.

Preferably, each grid strip is negatively biased by means of the direct current potential source 67, so that the beam from the cathode is normally blanked off from the fluorescent screen. On the other hand, when a transducer unit is energized by a sonar signal pulse reflected from a distant object a sufficient positive voltage is developed so as to bias the corresponding grid strip 44 to a potential to allow an arcuate portion of the beam to pass through the corresponding aperture between the said grid strip and a common grid electrode 42. The potentials applied to the various coatings 15, 16 and 17 are normally such that when all the grid strips 44 are keyed-on there is produced on the fluorescent screen a substantially continuous circular trace of a predetermined minimum diameter. The potential on the coatings, for example on the coating 15, can be increased by means of any well known saw-tooth time-base wave source 68 so as to increase the diameter of the circular trace.

The time-base between the zero and maximum voltage of each saw-tooth wave is correlated with the limits of the range to be read on the scope. For example, in well known sonar technique a superaudible pulse is transmitted and the zero of the saw-tooth wave from saw-tooth 68 is timed with the instant of transmission. The reflected pulses from the various distant objects at different ranges will then have times of arrival at the respective pick-up units 61, 62, 63, which will be correlated with the value at any given instant of the saw-tooth sweep voltage. This varying value of sweep voltage is applied to the coatings 15 and 16, and, in effect, tests for the presence of reflected objects at continuously increased distances. It will be understood, of course, that if radar pulses are transmitted the radar transmitter, like the sonar transmitter, may be of the omni-directional type. On the other hand, each unit may consist of an individual pulse transmitter and associated echo pulse receiver.

The individual grid strips 48 in effect subdivide this annular trace into forty-eight arcs each of approximately 7.5 degrees. Therefore, the radial displacement of an arc can be made to be a function of the range of a distant target and the particular angular orientation of the arc can be made to be a function of the bearing of the target. Thus, as shown in Fig. 8, there is a series of six arcuate spot displays each produced by the presence of an object in direct line with the corresponding pick-up transducer units. Each arcuate spot has a central region of high intensity with the leading and trailing portions of very much lower intensity and the width of the arc is approximately 7.5 degrees. The bright central portion of the arc provides a direct indication of the bearing of the distant object and, of course, the radial distance of the arc provides an indication of the range of that object. This will be clear from the directional sensitivity diagram of the various pick-up units, as shown in Fig. 10.

In order to explain the interpolation feature, it will be assumed that four objects are located with different bearings and at different ranges, as shown in Fig. 10, and only the corresponding transducer pick-up units 61, 62 and 63 are shown, with their respective directional sensitivity diagrams 64, 65, 66, all of which are alike as indicated. Since the object A is in direct line with unit 61 there is produced an arcuate display $a_1$ whose bright central region is at zero bearing corresponding to unit 61. Since the object B has a bearing half way between 0 degrees and 7.5 degrees, two adjacent grid strips 44 will be energized by the same echo pulse. On the assumption that the next adjacent grid strips are at cut-off, the display for object B will extend over more than 7.5 degrees but less than 15 degrees, but the greater positive field which exists at the region between the two adjacent energized grid strips causes the central portion of this arc to be of much higher intensity than the remaining portions. This central high intensity portion will then provide a bearing indication of approximately 3.75 degrees.

If the object C is, for example, at 1 degree bearing, two adjacent grid strips will be simultaneously energized by the same reflected pulse, but the high intensity portion of the arc will appear opposite the 1 degree bearing. If the object D is in direct line with unit 62 the display will be in the form of the arc $d_1$ with the central portion of greatest intensity and in alignment with the 7.5 degree bearing.

While one particular embodiment has been described, it will be understood that various changes and modifications may be made therein without departing from the spirit and scope of the invention. Thus, while in the preceding description the grid strips 44 have been illustrated as having a straight grid edge, it will be understood that this edge may be tapered, as represented by the numeral 69 in Fig. 12, or concavely curved as represented by the numeral 70 in Fig. 13. In this latter embodiment the edge of the corresponding common grid member 42 can be notched to provide a generally circular conformation to each controllable grid aperture. Thus, the member 42 and the various grid strips subdivide the cylindrical beam from the cathode into a series of individually controllable beams in spaced cylindrical array symmetrically and equally spaced around the central longitudinal axis of the tube.

Features disclosed herein, but not claimed, are claimed in my copending application Serial No. 361,560, filed on June 15, 1953.

What is claimed is:

1. A cathode-ray tube comprising a ceramic ring having an annular groove in its upper face, an annular cathode, means to support said cathode within said groove, an annular metal control grid member fastened to the upper face of said ring and having its circular margin overlying said groove, a plurality of other control grid members also fastened to the upper face of said ring and extending radially outward, the inner ends of said other grid members also overlying said groove and in spaced relation to said circular edge to define a circular array of individually controllable grid apertures, a first focussing disc in superposed insulated relation on said annular metal grid member and having its outer edge overlying said groove, a second focussing disc in superposed insulated relation to said other control grid members, the inner edge of said other focussing disc also overlying said groove and defining with the outer edge of the first focussing disc an annular focussing slit in circular alignment with said grid apertures.

2. A cathode-ray tube according to claim 1, in which said ceramic ring has a series of undercut radial slots in its upper face in which said grip strips are fastened.

3. A cathode-ray tube according to claim 1, in which said cathode is in the form of an annular container housing an annularly extending heater, and said ceramic ring has a series of radial slots in its underface in which are fastened a corresponding series of metal support rods, said annular container having openings in the opposite side walls to receive said rods and thereby to support the heater cathode unit in said groove.

References Cited in the file of this patent

UNITED STATES PATENTS 2,753,484    Bryant  ----------------- July 3, 1956